(12) United States Patent
Battaglia et al.

(10) Patent No.: US 6,286,694 B1
(45) Date of Patent: *Sep. 11, 2001

(54) DISPLAY STAND AND SHELF ASSEMBLY

(75) Inventors: Joseph M. Battaglia, Douglasville; Rafael T. Bustos, Atlanta, both of GA (US)

(73) Assignee: L&P Property Management Company, South Gate, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/621,189

(22) Filed: Jul. 21, 2000

Related U.S. Application Data

(63) Continuation-in-part of application No. 09/448,370, filed on Nov. 23, 1999, now Pat. No. 6,220,464
(60) Provisional application No. 60/206,023, filed on May 22, 2000.

(51) Int. Cl.[7] ..................................... A47B 57/20
(52) U.S. Cl. .................. 211/187; 211/90.01; 211/90.02; 108/147.12; 108/147.15; 108/107; 248/225.21
(58) Field of Search .................................. 211/186, 187, 211/181.1, 133.1, 133.2, 126.9, 90.01, 90.02, 90.03; 108/106, 107, 147.12, 147.13, 147.14, 147.15; 248/225.11, 225.21, 250, 243, 224.8

(56) References Cited

U.S. PATENT DOCUMENTS

| | | |
|---|---|---|
| Re. 28,293 | 1/1975 | Bustos . |
| D. 238,543 | 1/1976 | Lechner . |
| D. 282,325 | 1/1986 | Meier . |
| D. 292,764 | 11/1987 | Kester . |
| D. 321,101 | 10/1991 | Zucker . |
| D. 334,854 | 4/1993 | Pestone . |
| D. 373,035 | 8/1996 | Keller et al. . |
| 1,140,940 | 5/1915 | Bales . |
| 1,952,111 | 3/1934 | Bales . |
| 3,181,650 | 5/1965 | Cutter et al. . |
| 3,398,981 | 8/1968 | Vincens . |
| 3,498,239 | 3/1970 | Bartlett et al. . |
| 3,788,242 | 1/1974 | Hassel et al. . |
| 3,835,354 | 9/1974 | Torres-Pena . |
| 4,433,788 | 2/1984 | Erlam et al. . |
| 4,542,702 | 9/1985 | Johansson . |
| 4,934,858 | 6/1990 | Beaulieu . |
| 5,016,765 | 5/1991 | Leonardo . |
| 5,042,671 | 8/1991 | Bischoff et al. . |
| 5,207,527 | 5/1993 | Duncan et al. . |
| 5,609,402 | 3/1997 | Kemp . |
| 5,695,081 * | 12/1997 | Alkaley .................................. 211/187 |
| 5,727,699 | 3/1998 | Gilcrease . |
| 5,971,175 * | 10/1999 | Bustos .................................. 211/187 |
| 6,036,034 * | 3/2000 | Battaglia et al. ..................... 211/187 |
| 6,044,988 * | 4/2000 | Yang .................................... 211/187 |

* cited by examiner

*Primary Examiner*—Daniel P. Stodola
*Assistant Examiner*—Erica B Harris
(74) *Attorney, Agent, or Firm*—Wood, Herron & Evans, LLP

(57) ABSTRACT

A display stand including a plurality of vertical uprights defining a plurality of holes. Four vertical uprights are joined together and a shelf is attached thereto with a first set of clips fixedly attached to a first end of the shelf and a second set of clips slidably attached to the second end of a shelf. The first set of clips are first engaged with holes defined in the vertical uprights. Next, the second end of the shelf is lowered into position substantially at the same height as the first end of the shelf, whereby the second set of clips is slid from the first position flush with the first end of the shelf to the second position extending into the holes defined in the vertical uprights in order to support the shelf within the vertical uprights.

7 Claims, 2 Drawing Sheets

DISPLAY STAND AND SHELF ASSEMBLY

CROSS-REFERENCE TO RELATED APPLICATIONS

The present application is a continuation-in-part of U.S. patent application Ser. No. 09/448,370, filed Nov. 23, 1999, now U.S. Pat. No. 6,220,464. This application also claims priority benefit of U.S. Provisional Application Ser. No. 60/206,023 filed May 22, 2000, each of which is hereby incorporated herein by reference in its entirety.

FIELD OF THE INVENTION

This invention relates to display stands for merchandising products; and more particularly, to an improved shelf assembly for a four poster style of display stand which stand may be made by joining together a plurality of display stand modules.

BACKGROUND OF THE INVENTION

Display stands are typically used to store and display product in both refrigerated and non-refrigerated environments. Such display stands usually comprise a base, a plurality of vertical support members or posts extending upwardly from the base, and a top supported by the posts. A plurality of shelves are commonly supported by the vertical posts in any number of ways. Such display stands or shelving units are generally rectangular, and the shelves adapted to be used with the display stands are generally rectangular as well.

U.S. Pat. Nos. 5,016,765 and 3,788,242 disclose such display stands. In each of the display stands disclosed in these patents, a generally rectangular base has four members extending upwardly from the base, which members are used to support vertically oriented posts. Generally rectangular shelves may be supported by the posts at the desired heights. Similarly, the tops of each of the display stands disclosed in these patents have four members which are turned downwardly and inserted into the posts at the top of the display stand.

Each of the display stands disclosed in these patents is self-standing and is not adapted to be joined with other display stands in order to create a larger display stand. If more product is to be displayed, a second display stand must be purchased and placed adjacent to the first display stand. The display stands lack structure which would enable multiple display stands to be joined together to create a larger display stand or assembly.

In addition, such display stands are of a fixed width, length and height which cannot be modified or changed. Thus, if a merchant desires to display additional product above or beside the display stand, an additional display stand must be purchased and placed on top of or beside the existing display stand. Thus, the merchant has to pay for two or more display stands. Furthermore, if an additional display stand is placed on top of an existing display stand, the upper display stand may be unstable and may fall off the lower display stand.

Thus, a display stand which is modular in nature so that different modules may be secured to one another to create the desired structure is needed. With such a structure, modules may be placed on top of one another or connected to each other lengthwise or widthwise in order to create the desired display stand assembly.

It has been one objective of the present invention to provide an improved shelf assembly for a four poster style of display stand which stand may but need not necessarily be a modular display stand of the type which may be quickly and easily joined to other display stand modules in order to create an attractive and useful display stand assembly.

Yet another objective of the invention has been to create an improved shelf and clip assembly assembled from a limited number of similar components and joined to a display stand to create a display stand assembly.

SUMMARY OF THE INVENTION

The objectives of the present invention are achieved with an inventive display stand and shelf assembly, which display stand may but need not necessarily be of the modular style adapted to be joined to other display stand modules in order to make a display stand assembly. The display stand is assembled from four vertical uprights defining a plurality of holes, the vertical uprights being joined together by any suitable means, and preferably, by the method described in co-pending U.S. patent application Ser. No. 09/448,370. A substantially U-shaped wire grid shelf is connected to the vertical uprights. The shelf has first and second opposed ends and first and second opposed side walls having upper and lower wires. A first pair of clips is fixedly attached to the opposed side walls proximate the first end of the wire grid shelf. Each clip has an integral tab which is received within a hole defined in the vertical uprights.

A second set of clips is slidably attached to the opposed side walls proximate the second end of the wire grid shelf and have tabs which, in a first position, are preferably flush with the second end of the shelf, and, in a second position, extend from the shelf and are received in the holes defined in the vertical uprights, preferably abutting the shelf second end. The tabs on the first and second set of clips preferably have notches which engage with the vertical uprights to prevent the clips from sliding within the holes.

Thus, a display stand assembly is provided in which a relatively few number of parts are required which are quickly and easily erected and disassembled, each display stand of the display stand assembly having one or more shelves which are quickly and easily engageable and disengageable from the vertical uprights.

DETAILED DESCRIPTION OF THE PREFERRED EMBODIMENTS

U.S. Pat. Ser. No. 09/448,370 is incorporated herein in its entirety by reference.

Figure 1:
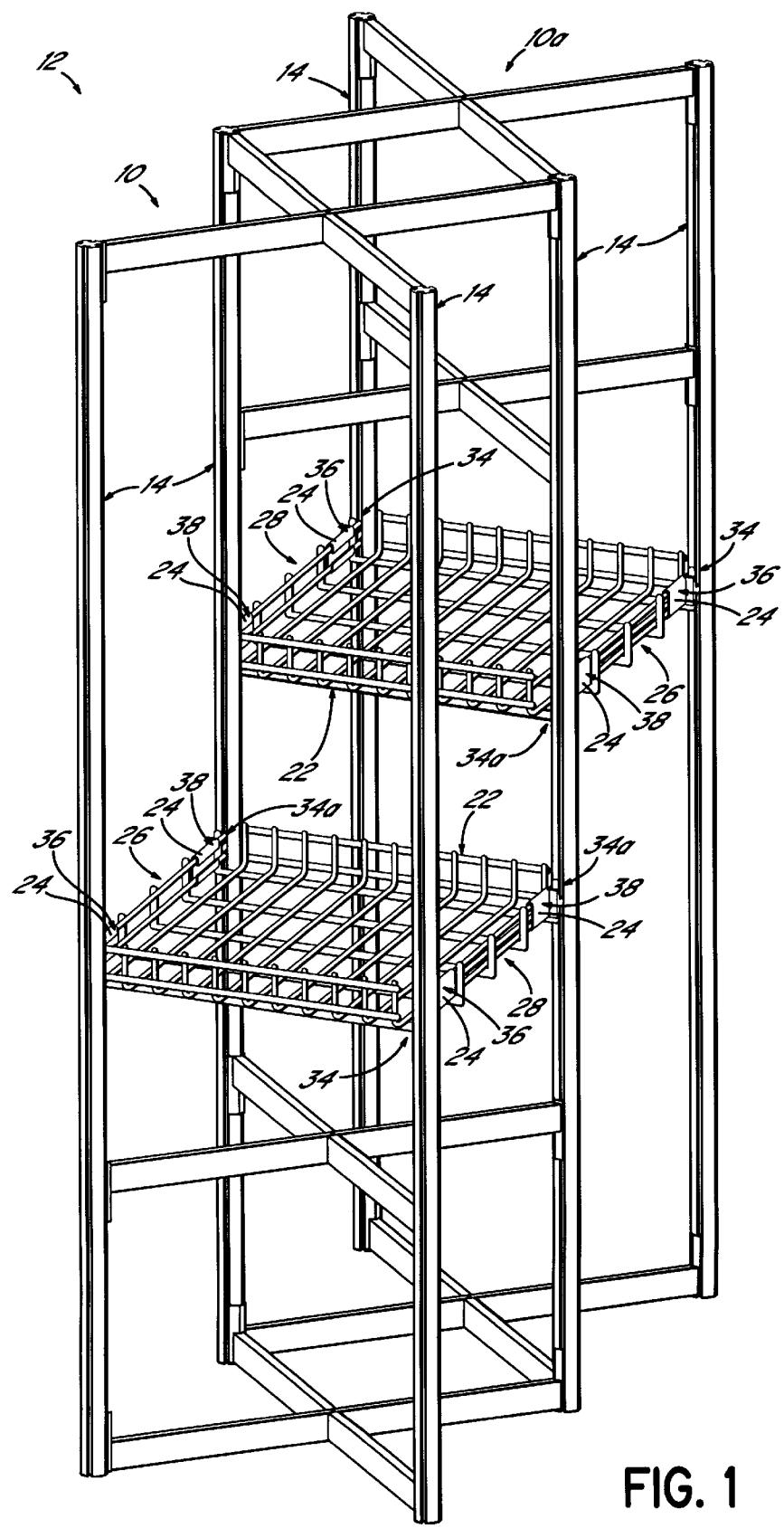
FIG. 1 is a perspective view of a display stand assembly made up of two display stand modules of the present invention.
Figure 2:
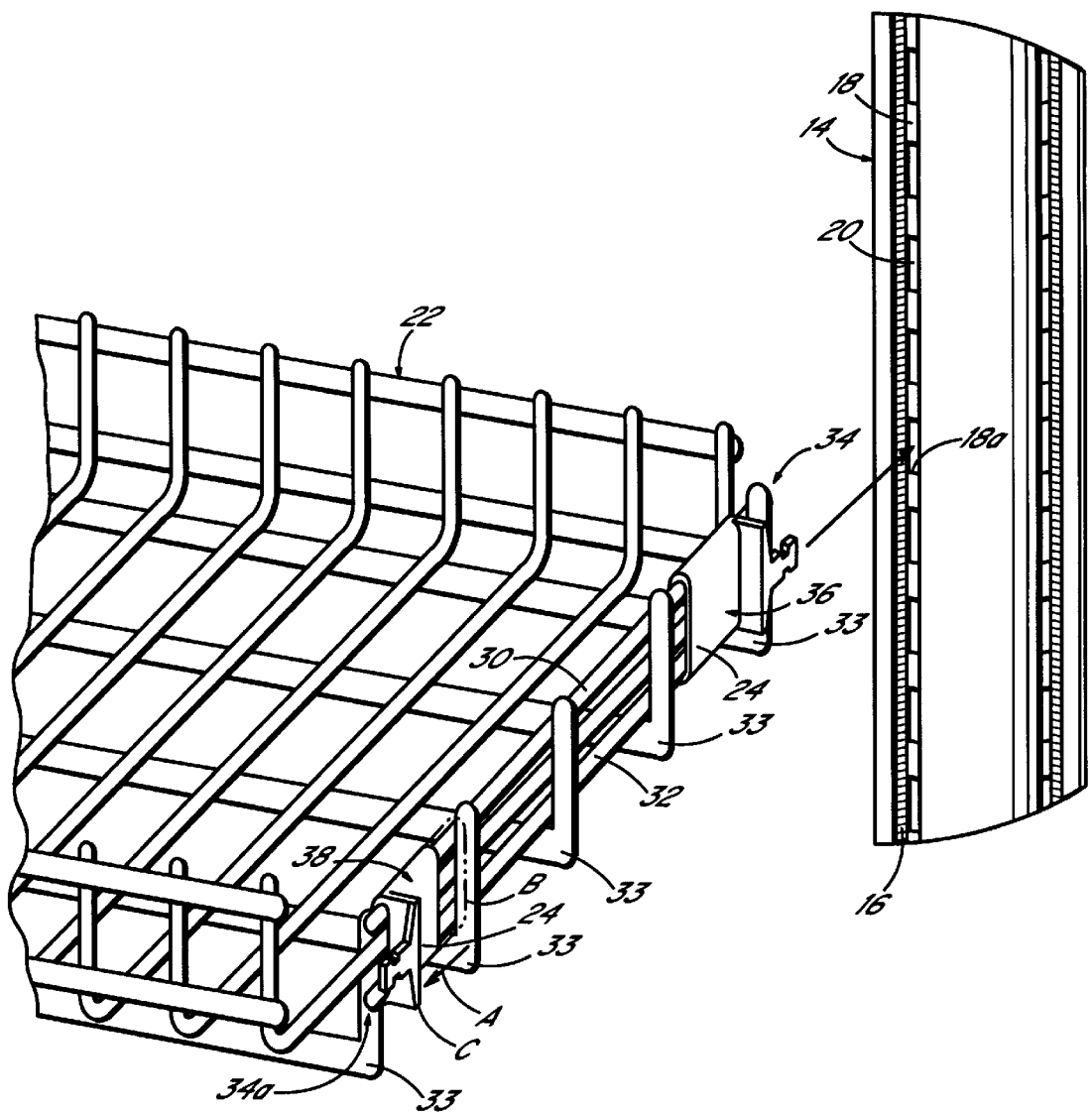
FIG. 2 is a partially cut-away perspective view of a shelf and clip assembly in partial assembly with display stand assembly uprights.

As can be seen generally in FIG. 1, a display stand module 10 is adapted to be joined to at least a second display stand module 10a to form a display stand assembly 12. Each display stand module 10, 10a has a plurality of columns or vertical uprights 14, defining a plurality of slots 16, with a vertical wall 18 in which plural adjacent holes 20 are defined as seen in FIG. 2. In one aspect of the present invention, the vertical upright 14 is preferably extruded. In another aspect of the present invention, the vertical upright 14 is a prerolled sheet which is assembled into the vertical upright 14. Preferably, the vertical upright 14 is hollow to save in materials cost and to lighten the display stand assembly 12. In a presently preferred embodiment, the vertical upright 14 may be made of aluminum or plastic. However, any other suitable material may be used to form the vertical upright 14.

A single stand or module 10 is preferably comprised of four vertical uprights 14 joined together by the apparatus described in co-pending U.S. patent application Ser. No. 09/448,370, commonly owned by the assignee of the present invention. After the uprights 14 have been joined together, a shelf 22 is secured thereto with clips 24. In one aspect of the present invention, the shelf 22 is a wire grid having first and second opposed side walls 26, 28 with upper and lower wires 30, 32 preferably attached to transverse wires 33 by any suitable means. The walls 26, 28 have a first end 34 near which a first set 36 of clips 24 is securely crimped to upper and lower wires 30, 32. The walls 26, 28 have a second end 34a near which a second set 38 of clips 24 is loosely attached to upper and lower wires 30, 32 so that the clips 24 may slide along the wires 30, 32 as indicated by arrow A.

Figure 3:
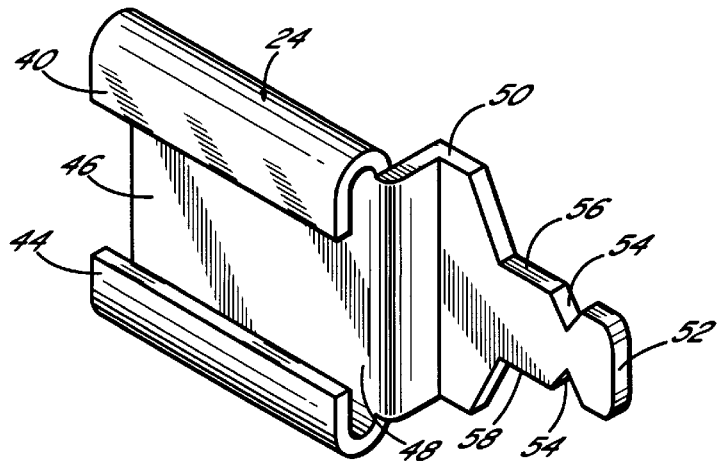
FIG. 3 is a perspective view of a clip in accordance with the principles of the present invention.

As illustrated in FIG. 3, clip 24 is generally U-shaped with first and second opposed flanges 40, 44 integral with a main body 46. Integral with first end 48 of the main body 46 is a generally L-shaped tab 50 which tapers toward free end 52. Inboard of the free end 52 are a pair of notches 54 defined in upper and lower edges 56, 58 of the tab 50.

The first set 36 of clips 24 are received in holes 20 defined in the vertical uprights 14 at a similar height along the longitudinal extent of adjacent vertical uprights 14. The second set 38 of clips 24 are adapted to slide along the upper and lower wires 30, 32 of opposed shelf side walls 26, 28 to be received within holes 20 defined in adjacent vertical uprights 14 at a similar height and preferably at a similar height to the first set 36 of clips 24. The notches 54 defined in the tabs 50 engage an edge 18a of the wall 18 to prevent the clip 24 from reciprocating freely within the hole 20. The second set 38 of clips 24 are slid upon the upper and lower wires 30, 32 from a first position B wherein the clips 38 are generally flush with the second end 34a to a second position C wherein the clips 38 extend from the shelf so the tabs 50 may be received within the holes 20 formed in the vertical uprights 14.

In use, four vertical uprights 14 are first joined together. The shelf 32 is assembled with adjacent vertical uprights 14 by first positioning the first end 34 to a desired similar height along the longitudinal extent of adjacent vertical uprights 14. The first set 36 of clips 24 are assembled with the adjacent vertical uprights 14 by journaling tabs 50 into respective holes 20 in the adjacent uprights 14 at the desired similar height. The notches 54 on the first set 36 of clips 24 are engaged with the uprights 14 in order to prevent the tabs 50 from slipping after being assembled. Next, the second end 34a is positioned to a substantially similar height as the first end 34 so that the second end 34a is located proximate adjacent vertical uprights 14 opposite the first end 34 with the second set 38 of clips 24 positioned flush with the second end 34a. The second set 38 of clips 24 slidably affixed to the second end 34a of the shelf 22, are lined up with respective holes 20 defined in the vertical uprights 14. The second set 38 of clips 24 are then slid in the direction of arrow A from first position B whereby the tabs 50 are in abutting relationship with the second end 34a, to position C, extended from the second end 34a and engaging the holes 20, whereby the notches 54 engage the vertical uprights 14.

Many modifications may be made to the specific details provided herein with respect to the display stand modules 10, 10a including, but not limited to, alternative shapes for tabs 50 and alternative configurations of clips 24. Applicant does not intend to be bound by the specific details provided herein but intends only to be bound by the scope of the appended claims.

Therefore, we claim:

1. A display stand assembly comprising:
a first display stand module, said first display stand module comprising four vertical uprights and a shelf connected to all four of said vertical uprights of said first display stand module, said shelf having first and second opposed ends, said first end having a first pair of clips fixedly attached thereto with integral tabs received within holes defined in said vertical uprights and said second end having a second pair of clips slidably attached thereto with integral tabs received within holes defined in said vertical uprights, wherein two of said vertical uprights of said first display stand module are common to a second display stand module,
said second display stand module comprising two vertical uprights in addition to said two uprights common with said first display stand module, said vertical uprights of said second display stand module being joined by connecting means.

2. A display stand assembly comprising:
a first display stand module comprising four vertical uprights,
a second display stand module comprising two vertical uprights in addition to two of said vertical uprights of said first display stand module, two of said vertical uprights of said first display stand module being common to said second display stand module, said uprights of each of said modules being joined by connecting means,
a wire shelf connected to said vertical uprights of at least one of said display stand modules, said wire shelf having first and second opposed ends, said first end having a first pair of clips fixedly attached thereto, said first pair of clips being received within holes in said vertical uprights and said second end of said wire shelf having a second pair of clips slidably attached thereto adapted to be received within holes in said vertical uprights.

3. A display stand assembly comprising:
a plurality of display stand modules joined together, each of said display stand modules comprising a plurality of vertical uprights and a plurality of X-shaped spanners, each of said X-shaped spanners being connected to said vertical uprights of said display stand module and holding said vertical uprights together, multiple X-shaped spanners of multiple display stand modules being connected to selected common vertical uprights wherein at least one of said display stand modules has a shelf extending between said vertical uprights, said shelf having clips slidably attached thereto for engaging holes in said vertical uprights.

4. The display stand assembly of claim 3 wherein said shelf has first and second opposed ends, one of said ends of said shelf having a pair of clips attached thereto with integral tabs received within said holes of said vertical uprights.

5. A display stand assembly comprising:
a first display stand module, said first display stand module comprising four vertical uprights, two of said vertical uprights of said first display stand module being common to a second display stand module, said second display stand module comprising two vertical uprights in addition to said two uprights common with said first display stand module and means connecting said vertical uprights of each of said second display stand modules, a shelf extending between said vertical uprights of at least one of said display stand modules, said shelf having first and second opposed ends, said first end of said shelf having a first pair of clips fixedly attached thereto with integral tabs received within holes defined in said vertical uprights and said second end of said shelf having a second pair of clips slidably attached thereto adapted to engage holes defined in said vertical uprights.

6. The display stand assembly of claim 5 wherein said shelf is a wire shelf.

7. A display stand assembly comprising:

a first display stand module, said first display stand module comprising four vertical uprights, two of said vertical uprights of said first display stand module being common to a second display stand module, said second display stand module comprising two vertical uprights in addition to said two uprights common with said first display stand module, said vertical uprights of each of said display stand modules being joined by connecting means, a shelf extending between said vertical uprights of at least one of said display stand modules, said shelf having first and second sets of clips, at least one of said sets of clips being slidably attached thereto to engage holes defined in said vertical uprights.

* * * * *